(12) United States Patent
Ducharme

(10) Patent No.: US 7,165,180 B1
(45) Date of Patent: Jan. 16, 2007

(54) MONOLITHIC SEMICONDUCTOR DEVICE FOR PREVENTING EXTERNAL ACCESS TO AN ENCRYPTION KEY

(75) Inventor: Paul Ducharme, Scarbourough (CA)

(73) Assignee: ViXS Systems, Inc., Toronto (CA)

( * ) Notice: Subject to any disclaimer, the term of this patent is extended or adjusted under 35 U.S.C. 154(b) by 795 days.

(21) Appl. No.: 09/995,308

(22) Filed: Nov. 27, 2001

(51) Int. Cl.
H04K 1/00 (2006.01)
H04L 9/00 (2006.01)
H04L 9/30 (2006.01)
G11C 17/18 (2006.01)

(52) U.S. Cl. .......................... 713/182; 380/9; 380/45; 380/46; 380/47; 380/21; 380/30; 365/225.7

(58) Field of Classification Search ............ 380/21, 380/30, 9, 45–49; 365/225.7; 713/182
See application file for complete search history.

(56) References Cited

U.S. PATENT DOCUMENTS

| | | | |
|---|---|---|---|
| 4,866,395 A | 9/1989 | Hosteller | |
| 5,027,203 A | 6/1991 | Samad et al. | |
| 5,093,847 A | 3/1992 | Cheng | |
| 5,115,812 A | 5/1992 | Sano et al. | |
| 5,253,056 A | 10/1993 | Puri | |
| 5,475,434 A | 12/1995 | Kim | |
| 5,563,950 A * | 10/1996 | Easter et al. | 713/191 |
| 5,602,589 A | 2/1997 | Vishwanath et al. | |
| 5,635,985 A | 6/1997 | Boyce et al. | |
| 5,644,361 A | 7/1997 | Ran et al. | |
| 5,652,749 A | 7/1997 | Davenport et al. | |
| 5,732,391 A | 3/1998 | Fiocca | |
| 5,737,020 A | 4/1998 | Hall et al. | |
| 5,740,028 A | 4/1998 | Sugiyama et al. | |
| 5,844,545 A | 12/1998 | Suzuki et al. | |
| 5,850,443 A * | 12/1998 | Van Oorschot et al. | 380/285 |
| 5,940,130 A | 8/1999 | Nilsson et al. | |
| 5,996,029 A | 11/1999 | Sugiyama et al. | |
| 6,005,623 A | 12/1999 | Takahashi et al. | |
| 6,005,624 A | 12/1999 | Vainsencher | |
| 6,014,694 A | 1/2000 | Aharoni et al. | |
| 6,040,863 A | 3/2000 | Kato | |

(Continued)

FOREIGN PATENT DOCUMENTS

EP 0661826 A2 7/1995

(Continued)

OTHER PUBLICATIONS

Pedro Assuncao and Mohammad Ghanbari, "Rate Reduction Techniques for MPEG-2 Video Bit Streams," SPIE vol. 2962, Apr. 1996, 10 pp.

(Continued)

Primary Examiner—Ayaz Sheikh
Assistant Examiner—Shin-Hon Chen

(57) ABSTRACT

A monolithic semiconductor device having an encryption engine and encryption key register to store one or more encryption keys, where the contents of the encryption key register are observable, or can be made observable, only to internal components of the device is disclosed herein. The encryption key register can be implemented as an integrated or non-integrated volatile or non-volatile memory location. The monolithic semiconductor device can also include means for temporarily externally accessing and/or defining the contents of the key register during the manufacturing process and/or for a limited number of times after the manufacture and/or testing of the monolithic semiconductor device is completed.

17 Claims, 5 Drawing Sheets

U.S. PATENT DOCUMENTS

| | | | |
|---|---|---|---|
| 6,081,295 | A | 6/2000 | Adolph et al. |
| 6,141,693 | A | 10/2000 | Perlman et al. |
| 6,144,402 | A | 11/2000 | Norsworthy et al. |
| 6,167,084 | A | 12/2000 | Wang et al. |
| 6,182,203 | B1 | 1/2001 | Simar, Jr. et al. |
| 6,215,821 | B1 | 4/2001 | Chen |
| 6,219,358 | B1 | 4/2001 | Pinder et al. |
| 6,222,886 | B1 | 4/2001 | Yogeshwar |
| 6,236,683 | B1 | 5/2001 | Mougeat et al. |
| 6,259,741 | B1 | 7/2001 | Chen et al. |
| 6,263,022 | B1 | 7/2001 | Chen et al. |
| 6,300,973 | B1 | 10/2001 | Feder et al. |
| 6,307,939 | B1 | 10/2001 | Vigarie |
| 6,314,138 | B1 | 11/2001 | Lemaguet |
| 6,323,904 | B1 | 11/2001 | Knee |
| 6,366,614 | B1 | 4/2002 | Pian et al. |
| 6,385,248 | B1 | 5/2002 | Pearlstein et al. |
| 6,438,168 | B1 | 8/2002 | Arye |
| 6,480,541 | B1 | 11/2002 | Girod et al. |
| 6,526,099 | B1 | 2/2003 | Christopoulos et al. |
| 6,549,561 | B1 | 4/2003 | Crawford |
| 6,584,509 | B1 | 6/2003 | Putzolu |
| 6,714,202 | B1 | 3/2004 | Dorrell |
| 6,724,726 | B1 | 4/2004 | Coudreuse |
| 6,748,020 | B1 | 6/2004 | Eifrig et al. |
| 2001/0026591 | A1 | 10/2001 | Keren et al. |
| 2002/0106022 | A1 | 8/2002 | Takahashi et al. |
| 2002/0110193 | A1 | 8/2002 | Kyoon et al. |
| 2002/0138259 | A1 | 9/2002 | Kawahara |
| 2002/0145931 | A1* | 10/2002 | Pitts ........................ 365/225.7 |
| 2002/0196851 | A1 | 12/2002 | Arnaud |
| 2003/0093661 | A1* | 5/2003 | Loh et al. ...................... 713/2 |
| 2003/0152148 | A1 | 8/2003 | Laksono |

FOREIGN PATENT DOCUMENTS

| | | |
|---|---|---|
| EP | 0739138 A2 | 10/1996 |
| EP | 0805599 A2 | 11/1997 |
| EP | 0855805 A2 | 7/1998 |
| EP | 0896300 B1 | 2/1999 |
| EP | 0901285 A1 | 2/1999 |
| EP | 0955607 A2 | 11/1999 |
| EP | 1032214 A2 | 8/2000 |
| EP | 1087625 A2 | 3/2001 |
| JP | 07-210670 A | 8/1995 |
| WO | WO 01/95633 A2 | 12/2001 |
| WO | WO 02/080518 A2 | 10/2002 |

OTHER PUBLICATIONS

Jae-Young Pyun, "QoS Provisioning for Video Streaming over IEEE 802.11 Wireless LAN," (abridged) IEEE Conference in Consumer Electronics, Jun. 16, 2003, 3 pp. [online] Retrieved from the Internet Jul. 8, 2003 at URL.

Krisda Lengwehasatit and Antonio Ortega, "Computationally Scalable Partial Distance Based Fast Search Motion Estimation," Univ. of Southern California, 4 pp., date unknown.

Manoj Aggarwal and Ajai Narayan, "Efficient Huffman Decoding," 2000 IEEE, 0-7803-6297-7, pp. 936-939.

Peng Yin et al., "Video Transcoding by Reducing Spatial Resolution," Princeton University, Princeton, NJ, 4 pp., 2000.

Zhigang Fan and Ricardo de Queiroz, "Maximum Likelihood Estimation of JPEG Quantization Table in the Identification of Bitmap Compression History," Xerox Corporation, Webster, NY, 4 pp., date unknown.

Luis Ducla Soares et al., "Influence of Encoder Parameters on the Decoded Video Quality for MPEG-4 over W-CDMA Mobile Networks," NTT DoCoMo, Inc. technical paper, 4 pp., date unknown.

Thomas Wiegand et al., "Long-Term Memory Motion-Compensated Prediction for Robust Video Transmission," in Proc. ICIP2000, 4 pp.

P. Greg Sherwood et al., "Efficient Image and Channel Coding for Wireless Packet Networks," Univ. of CA, San Diego, CA, Dept. of ECE; 4 pp., date unknown.

Donghoon Yu et al., "Fast Motion Estimation for Shape Coding in MPEG-4," 2003 IEEE Transactions on Circuits and Systems for Video Technology, vol. 13, No. 4, Apr. 2003, pp. 358-363.

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG2003061S0070> retrieved Jul. 8, 2003.

Youn, Jeongnam et al., "Video Transcoding For Multiple Clients," Proceedings of the SPIE, Bellingham, VA, vol. 4167, XP008012075, pp. 76-85, University of Washington, Sealttle, WA.

Lengwehasatit, Krisda et al.. "Computationally Scalable Partial Distance Based Fast Search Motion Estimation," Packet Video Corp., San Diego, California.

Takahashi, Kuniaki, et al., "Motion Vector Synthesis Algorithm for MPEG2-to-MPEG4 Transcoder," Proceedings of the SPIE, Bellingham, VA, vol. 4310, Sony Corporation, XP008000078, pp. 387-882, 2001 SPIE.

Soares, Luis Ducla, et al., "Influence of Encoder Parameters on the Decoded Video Quality for MPEG-4 Over W-CDMA Mobile Networks," NTT DoCoMo, Inc.

Aggarwal, Manoj et al., "Efficient Huffman Decoding," 2000 IEEE, 0-7803-6297-7, pp. 936-939, University of Illinois at Urbana-Champaign, Urbana, IL.

Sherwood, P. Greg et al., "Efficient Image and Channel Coding for Wireless Packet Networks," University of California, La Jolla, California.

Assuncao, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Wiegand, Thomas et al., "Long-Term Memory Motion-Compensated Prediction for Robust Video Transmittion," in Proc. ICIP 2000, University of Erlangen-Buremberg, Erlangen, Germany.

Fan, Zhigang et al. "Maximum Likelihood Estimation of JPEG Quantization Table in the Identification of Bitmap Compression History," Xerox Corporation, Webster, New York.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India.

Ramanujan, Ranga S. et al., "Adaptive Streaming of MPEG Video Over IP Networks," 22nd IEEE Conference on Local Computer Networks (LCN '97), Nov. 2-5, 1997, 1997 IEEE, pp. 398-409, Architecture Technology Corporation, Minneapolis, MN.

Rejaie, Reza et al., "Architectural Considerations for Playback of Quality Adaptive Video Over the Internet," XP002177090, 2000 IEEE pp. 204-209, AT&T Labs, Menlo Park, California.

Bouras, C. et al., "On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions On Circuits and Systems For Video Technology, vol. 7, No. 3 Jun. 1997, pp. 477-488.

Oh, Hwang-Seok et al., "Block-Matching Algorithm Based On An Adaptive Reduction of the Search Area For Motion Estimation," Real-Time Imaging, Academic Press Ltd., vol. 56, No. 5, Oct. 2000, pp. 407-414, XP004419498 ISSN: 1077-2014 , Taejon, Korea.

Lee, Liang-Wai et al., "Dynamic Search-Window Adjustment and Interlaced Search for Block-Matching Algorithm," IEEE Transactions On Circuits and Systems for Video Technology, IEEE, vol. 3, No. 1, Feb. 3, 1993, pp. 85-87, XP000334581 ISSN: 1051-8215, New York.

Fukunaga, Shigeru et al., "MPEG-4 Video Verification Model Version 16.0" International Organization for Standardization: Coding of Moving Pictures and Audio, vol. N3312, Mar. 2000, pp. 1-380, XP000861688.

Kroner, Sabine et al., "Edge Preserving Noise Smoothing With An Optimized Cubic Filter," DEEI, University of Trieste, Trieste, Italy.

Kim, Jaemin et al., "Spatiotemporal Adaptive 3-D Kalman Filter for Video," pp. 1-12. Samsung Semiconductor, Inc. San Jose, California.

Liu, Julia J., "ECE497KJ Course Project: Applications of Wiener Filtering In Image and Video De-Noising," pp. 1-15, May 21, 1997.

Jostschulte, K. et al., "A Subband Based Spatio-Temporal Noise Reduction Technique for Interlaced Video Signals," University Dortmund, Dortmund, Germany.

Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.

Tourapis, Alexis et al. "New Results on Zonal Based Motion Estimation Algorithms—Advanced Predictive Diamond Zonal Search," 2001 IEEE, pp. V 183-V 186, The Hong Kong University of Science and Technology, Clear Water Bay, Kowloon, Hong Kong.

Brandenburg, Karlheinz, "MP3 and AAC Explained," Proceedings of AES 17th International Conference, XP008004053, pp. 99-110, Erlangen, Germany.

Painter, Ted et al., "Perceptial Coding of Digital Audio," Proceedings of the IEEE, vol. 88, No. 4, Apr. 2000, pp. 451-513, XP001143231, ISSN: 0018-9219, Arizona State University, Tempe, AZ.

Hassanzadegan, Hooman et al., "A New Method for Clock Recovery in MPEG Decoders," pp. 1-8, Basamad Negar Company, Tehran, Iran.

Kan, Kou-Sou et al., "Low Complexity and Low-Delay Video Transcoding for Compressed MPEG-2 Bitstream," Natinal Central University, Chung-Li, Taiwan.

Mitchell et al., "MPEG Video Compression Standard: 15.2 Encorder and Decorder Buffering," Chapman and Hall Digital Multimedia Standards Series, pp. 340-356, XP002115299, ISBN: 0-412-08771-5, Chapman and Hall, New York.

Whybray, M.W. et al., "Video Coding—Techniques, Standards and Applications," BT Technol J. vol. 14, No. 4, Oct. 4, 1997, pp. 86-100, XP000722036.

"SHARP Product Information: VTST-Series NTSC/PAL Electronic Television Tuners," RF Components Group, Sharp Microelectronics of the America, 1997.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Oz, Ran et al., "Unified Headend Technical Management of Digital Services," BigBend Networks, Inc.

Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.

"CONEXANT Products & Tech Info: Product Briefs: CX24108," 2000-2002 Conexant Systems, Inc. access on Apr. 20, 2001.

"CONEXANT Products & Tech Info: Product Briefs: CX22702," 2000-2002 Conexant Systems, Inc. access on Apr. 20, 2001.

"TDC: Components for Modems & Digital Infotainment: Direct Broadcast Satellite Chipset," 2001 Telecom Design Communications Ltd., U.K., <<http://www.tdc.co.uk/modmulti/settop/index.htm>>, access on Apr. 20, 2001.

"White Paper: Super G: Maximizing Wireless Performance," Mar. 2004, Atheros Communications, Inc., pp. 1-20, Document No. 991-00006-001, Sunnyvale, California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, 1996 IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.

"Ice Fyre Semiconductor: IceFyre 5-GHz OFDM Modem Solution," Sep. 2001, pp. 1-6, IceFyre: Rethink Wireless, IceFyre Semiconductor, Inc.

Pozar, David M., "Theory and Design of Ferrimagnetic Components," 1990, pp. 529, Microwave Engineering, Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard fo rinformation Technology, IEEE Std 802.11a-1999, LAN/MAN Standards Committee.

Ciciora, Walter S., "Cable Television in the United States: An Overview," May 25, 1995, pp. 1-90, Cable Television Laboratories, Inc., Louisville, Colorado.

* cited by examiner

MONOLITHIC SEMICONDUCTOR DEVICE FOR PREVENTING EXTERNAL ACCESS TO AN ENCRYPTION KEY

FIELD OF THE DISCLOSURE

The present disclosure relates generally to encryption of data and more particularly to preventing access to an encryption key used to encrypt and/or decrypt data.

BACKGROUND

Encryption and/or scrambling methods are commonly implemented in devices and systems to protect data from illicit access and/or tampering. For example, many providers of motion pictures experts group (MPEG) encoded multimedia content use encryption to prevent unauthorized copying of the MPEG content before it is decoded. However, to keep the encrypted data secure, the means of encryption and/or decryption also must be secure. One method used to ensure the "strength" of the encryption method is to use a proprietary encryption/decryption algorithm. However, the strength of this type of encryption depends on the secrecy of the proprietary encryption/decryption algorithm, which can rarely be assured. Other encryption methods utilize well-known encryption/decryption algorithms, but rely on the secrecy of a specific encryption key to ensure the "strength" of the encryption.

While ensuring the secrecy of a specific encryption key is generally much less difficult than ensuring the secrecy of a proprietary encryption/decryption algorithm, the private encryption keys used by conventional encryption systems are still relatively accessible by an unauthorized entity. In software encryption implementations, the private encryption key can often be obtained by accessing a location of the system memory of the system executing the encryption software. Alternatively, the traces or wires that connect different circuit elements of a system or device can be probed by a logic analyzer or other device to observe the encryption key and/or the decrypted data as it is transmitted from one circuit component to another. These methods of illicitly accessing the private key generally require minimal effort, thereby often defeating only casual attempts at accessing the private key.

Given these limitations, as discussed, it is apparent that a device to improve the security of encryption keys would be advantageous.

BRIEF DESCRIPTION OF THE DRAWINGS

Various advantages, features and characteristics of the present disclosure, as well as methods, operation and functions of related elements of structure, and the combination of parts and economies of manufacture, will become apparent upon consideration of the following description and claims with reference to the accompanying drawings, all of which form a part of this specification.

DETAILED DESCRIPTION OF THE FIGURES

In accordance with the present disclosure, a monolithic semiconductor device, such as an integrated circuit, is disclosed. The monolithic semiconductor device includes an encryption engine having an input port and a memory location having an output port connected to the input port, wherein a data value to be stored in the memory location is observable only by the encryption engine. One advantage in accordance with a specific embodiment of the present disclosure is that encryption keys stored in the memory location are more secure from illicit external access.

FIGS. 1–7 illustrate a monolithic semiconductor device having an encryption engine and encryption key register to store one or more encryption keys, where the contents of the encryption key register are observable, or can be made observable, only to internal components of the monolithic semiconductor device. The encryption key register can be implemented as an integrated or non-integrated non-volatile or volatile memory location. In at least one embodiment, the monolithic semiconductor device includes one or more means for externally accessing and/or defining the contents of the key register during the manufacturing process and/or for a limited number of times after the manufacture of the monolithic semiconductor device is completed.

Figure 1:
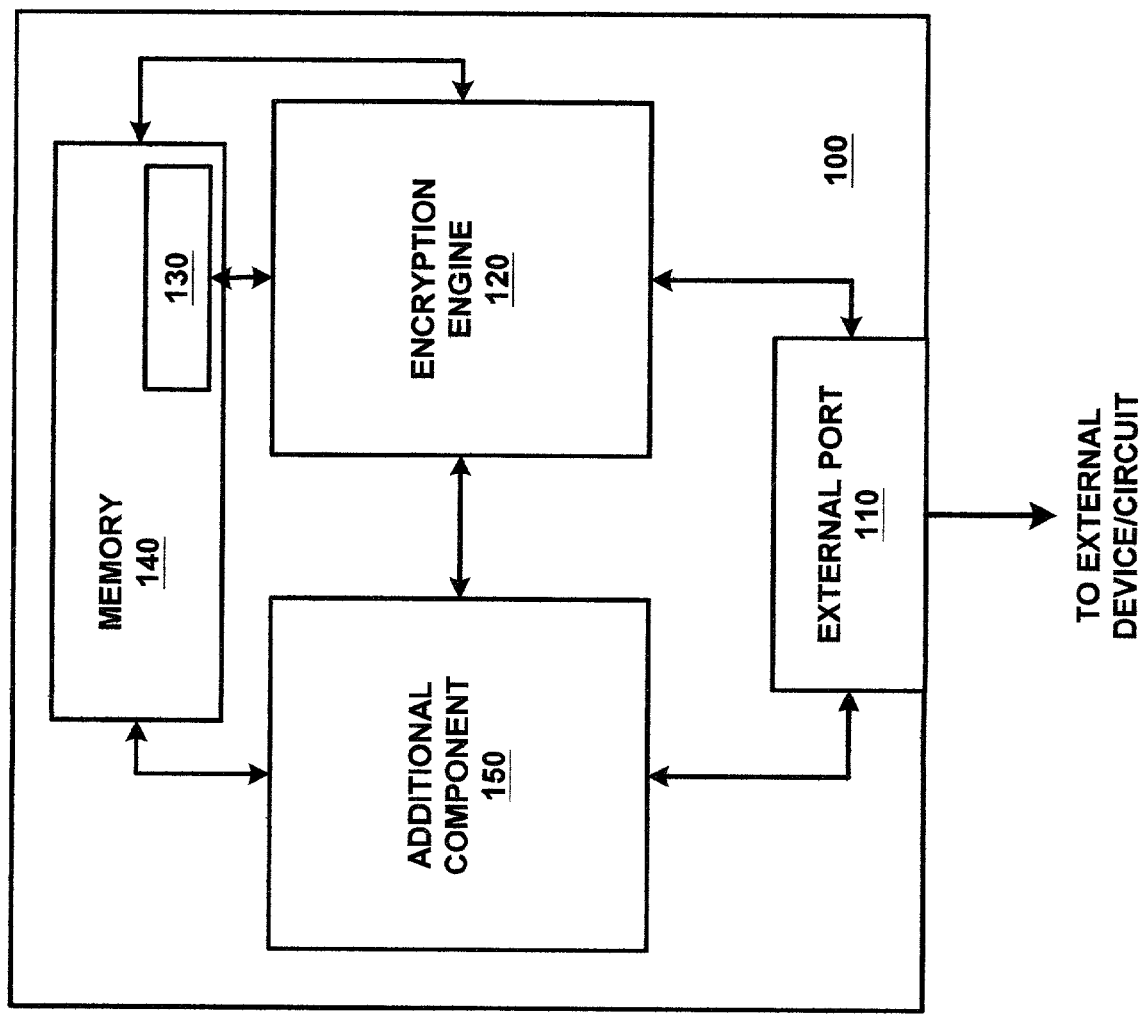
FIG. 1 is a block diagram illustrating a monolithic semiconductor device in accordance with at least one embodiment of the present disclosure.

Referring now to FIG. 1, monolithic semiconductor device 100 is illustrated according to at least one embodiment of the present disclosure. Monolithic semiconductor device 100 includes external port 110, encryption engine 120, and key register 130. Monolithic semiconductor device 100 can also include memory 140, which can include key register 130, and/or additional component 150. Monolithic semiconductor device 100 can include any one of a variety of monolithic semiconductor chips or circuits, such as an integrated circuit (IC), an application specific integrated circuit (ASIC), a dual-inline package (DIP), a microprocessor, and the like. For example, in at least one embodiment, monolithic semiconductor device 100 can be implemented as an ASIC used to decrypt encrypted multimedia content for a motion pictures experts group (MPEG) decoder. Monolithic semiconductor device 100 can be formed on a silicon substrate, a gallium arsenide substrate, or using any other semiconductor fabrication technology.

In the following discussion, the terms "encryption" and "scrambling", and their counterparts "decryption" and "descrambling", are used to describe operations to render data unintelligible to an unauthorized entity. The term "scrambling" generally refers to using relatively efficient algorithms that use shift and/or XOR operations on large amounts of data. For example, data encryption standard (DES) scrambling is often used on video data. On the other hand, the term "encryption" generally refers to using relatively computationally intensive algorithms that use keys to render relatively small amounts of data unintelligible. One example of an encryption algorithm is the Rivest-Shamir-Adleman (RSA) algorithm. In at least one embodiment, monolithic semiconductor device 100 uses both encryption and scrambling. For example, monolithic semiconductor device 100 could receive a large amount of video data scrambled using the DES algorithm and a control word encrypted using the RSA algorithm. Monolithic semiconductor device 100 could then decrypt the control word, and then use the decrypted control word to descramble the scrambled video data. Although the means differ, encryption and scrambling are both used to the same end, i.e. rendering data unintelligible to unauthorized entities. Accordingly, the term "encryption", as used herein, refers to either "encryption" and "scrambling", or both, unless otherwise noted. As a guideline, however, scrambling/descrambling is typically used on relatively large amounts of data, such as video data, and encryption/decryption is used on relatively smaller amounts of data, such as a control word used to scramble/descramble video data.

In at least one embodiment, an encryption key stored in key register 130 is provided to encryption engine 120. Encryption engine 120 can then use part or all of the encryption key to perform an encryption/decryption function on data. For example, encryption engine 120 can be used to decrypt incoming data from external port 110 and provide the decrypted data to additional component 150, or encryption engine 120 can encrypt data provided by additional component 150 and provide the encrypted data to external port 110 for output to an external device or circuit. External port 110 can include an input port, an output port, or an input/output (I/O) port utilized as an interface with an external device or circuit. Additional component 150 can include any variety of internal logic and/or circuitry to perform one or more functions of monolithic semiconductor device 100. For example, additional circuitry can include a hardwired implementation of an symmetrical encryption method, such as the data encryption standard (DES), an implementation of a motion pictures experts group (MPEG) decoder, and the like.

The encryption key stored in key register 130 can include a symmetrical key or control word used by symmetrical encryption methods such as Data Encryption Standard (DES), where the same symmetrical key is used to encrypt and decrypt data. Alternatively, in at least one embodiment, the encryption key stored in key register 130 includes an asymmetrical key used by asymmetrical encryption methods such as the RSA. In asymmetrical encryption methods, one key is used to encrypt data (the public key of the recipient of the encrypted data) and one key is used to decrypt encrypted data (the private key of the recipient). For example, as discussed in greater detail with reference to FIG. 7, encryption engine 120 can include an asymmetrical encryption engine and additional component 150 can include a symmetrical encryption engine. In this case, encryption engine 120 be used to decrypt an encrypted control word, and the control word can then be provided to the symmetrical encryption engine (additional component 150) to decrypt data encrypted by another device or system using the control word.

In at least one embodiment, encryption engine 120 is capable of using a portion of the encryption key stored in key register 130 based on the level of security desired. For example, key register 130 could include a 128-bit private encryption key. In this case, encryption engine 120 could have access to a plurality of public keys corresponding to different sized portions of the 128-bit private encryption key. For example, the first forty bits of the private key in key register 130 can be used in conjunction with a corresponding public key to provide minimum security, the first 64 bits of the private key can be used in conjunction with a corresponding public key to provide moderate security, and the full 128 bits can be used in conjunction with a different corresponding public key to provide a high level of security. Alternatively, key register 130 can include a plurality of encryption keys with the same or different bit lengths. For example, key register 130 can include a 512-bit ROM having a 256-bit encryption key, a 128-bit encryption key, and two 64-bit encryption keys. In this case, encryption engine 120 can obtain one key of the plurality of encryption keys based on a variety of factors. For example, each one of the encryption keys could be associated with each of a plurality of external device types that can interface with monolithic semiconductor device 100.

It will be appreciated that access by third parties to the key used to encrypt and decrypt data is prevented to maintain the integrity of the encrypted data. For example, if an unauthorized entity were to obtain the symmetric key from key register 130, the unauthorized entity could easily decrypt encrypted data transmitted for reception by monolithic semiconductor device 100. Accordingly, the contents (i.e. the encryption key) of key register 130 of monolithic semiconductor device 100, in at least one embodiment, are inaccessible, i.e. unobservable, to any device external to monolithic semiconductor device 100. Similarly, in one embodiment, the contents of key register 130 are observable only by encryption engine 120.

Key register 130 can be implemented in a variety of ways. In at least one embodiment, key register 130, as well as its contents, are implemented as non-volatile memory in an internally accessible location. For example, monolithic semiconductor device 100 can include memory 140, where memory 140 can include read only memory (ROM), programmable ROM (PROM), and the like. In this case, key register 130 could be represented by a memory location of memory 140 that can only be accessed by one or more internal components of monolithic semiconductor device 100. For example, the address of memory 140 representing key register 130 could be accessed only by asserting an enable pin of memory 140 that is only connected to encryption engine 120, therefore accessible only by encryption engine 120.

Alternatively, key register 130 can be implemented as a separate read-only memory (ROM) module in a specific location of the silicon die of monolithic semiconductor device 100 during the fabrication of the silicon die. For example, if the silicon die of monolithic device 100 is etched using a lithography method, such as deep ultraviolet lithography (DUVL) or extreme ultraviolet lithography (EUVL), the specified portion of the lithographic mask representing key register 130 as ROM can be modified to etch a specific bit sequence (i.e. the encryption key) in the specified portion of the silicon die. For the manufacture of subsequent monolithic semiconductor devices 100, the lithographic mask can be modified for each silicon die to generate a different bit sequence for the ROM portion. Similarly, a first lithographic mask can be applied to the silicon die of monolithic semiconductor device 100 to etch the portions of the silicon die not represented by key register 130. A second lithographic mask can then be applied to the unetched portion of the silicon die to generate a ROM region representing key register 130 and its encryption key content. Alternatively, a laser etching process can be used to define the portion of the silicon die representing key register 130 to have the desired encryption key value.

In another embodiment, key register 130 is implemented as volatile memory, such as a register, cache, random access memory (RAM), and the like. In this case, an encryption key can be generated by encryption engine 120 and stored in key register 130. For example, key register 130 can be implemented as random access memory (RAM) and the data value stored in the RAM is defined by encryption engine 120 each time monolithic semiconductor device 100 is "powered up" or a new encryption session is initiated. Alternatively, an external device or circuit can generate an encryption key and provide the encryption key to key register 130 via external port 110. As discussed in greater detail subsequently, this access to key register 130 can be limited to a one-time access by using a fuse or other device to prevent subsequent external access.

As discussed previously, in at least one embodiment, devices and/or circuits external to a monolithic semiconductor device 100 are prevented from observing the contents of an internal key register 130 used to store an encryption key. One method used to prevent external access to key register 130 is to place key register 130 in a location on the silicon die of monolithic semiconductor device 100 physically and logically accessible only by one or more of the internal components. For example, the output port of key register 130 can be physically connected only to an input port of encryption engine 120. In addition, the components of monolithic semiconductor device 100 can be designed so that disclosure of the contents of key register 130 cannot be output via external port 110. For example, the logic structure of encryption engine 120 can be designed so that no command or sequence of commands directed to encryption engine 120 will cause the disclosure of the contents of key register 130 to the external entity.

In conventional systems utilizing encryption methods, traces or connections between components of the system can be probed to gain access to encryption keys and/or encrypted data, thereby defeating the protection afforded by encrypting data. However, according to at least one implementation of present disclosure, access to the encryption key can be prevented to all but the most determined. It will be appreciated that by isolating key register 130, unauthorized entities will have considerable difficulty accessing contents of key register 130. Since key register 130 is part of a monolithic semiconductor device and the contents of key register 130 are observable by only one or more internal components of the monolithic semiconductor device, the contents of key register 130 cannot be observed outside of the monolithic semiconductor device. In order to access key register 130, an unauthorized entity generally would need to disassemble the monolithic semiconductor device, oftentimes destroying the monolithic semiconductor device in the process and therefore rendering useless the ill-gotten contents of key register 130. Likewise, if the unauthorized entity did gain access to one key register 130 of a monolithic semiconductor device, only the encryption key associated with that single monolithic semiconductor device would be compromised because the other monolithic semiconductor devices can have different an unique encryption keys stored in their key registers 130.

It will be appreciated that temporary external access to the key register of a monolithic semiconductor device may be appropriate. For example, during testing of the monolithic semiconductor device after manufacture, it may be desirable to verify the value of the encryption key stored in the key register by making the contents of the key register one-time accessible to external circuits or devices. Likewise, in one embodiment, the contents of the key register can be defined during the manufacturing process or by a third-party. For example, the key register could include a programmable read only memory (PROM), such as EEPROM or one-time programmable ROM (OTPROM) programmed at the end of the manufacturing process to store a specified encryption key.

Accordingly, in at least one embodiment, the monolithic semiconductor device is modified to prevent subsequent access to the contents of the key register by an external entity after an initial access for testing, verification, or manufacturing purposes. For example, a test program may need access to key register 130 to verify that key register 130 holds the proper encryption value. In this case, the test program could either access key register 130 directly to obtain the value of the encryption key or the test program could provide encryption engine 120 with encrypted data that can only be decrypted using the correct key that is to be stored in key register 130. If encryption engine 120 is able to decrypt the data using the value stored in key register 130, then the contents of key register 130 can be considered correct. If encryption engine 120 is unable to encrypt the data, then the value is likely corrupt. It will be appreciated that since the value (the encryption key) is different for each monolithic semiconductor device, the test program needs to be dynamic so that the different value for each monolithic semiconductor device can be tested. It will be appreciated that while initial external access for testing purposes may be desired, subsequent external access after the testing is complete is to be prevented. FIGS. 2–5 illustrate various methods for preventing subsequent access.

Figure 2:
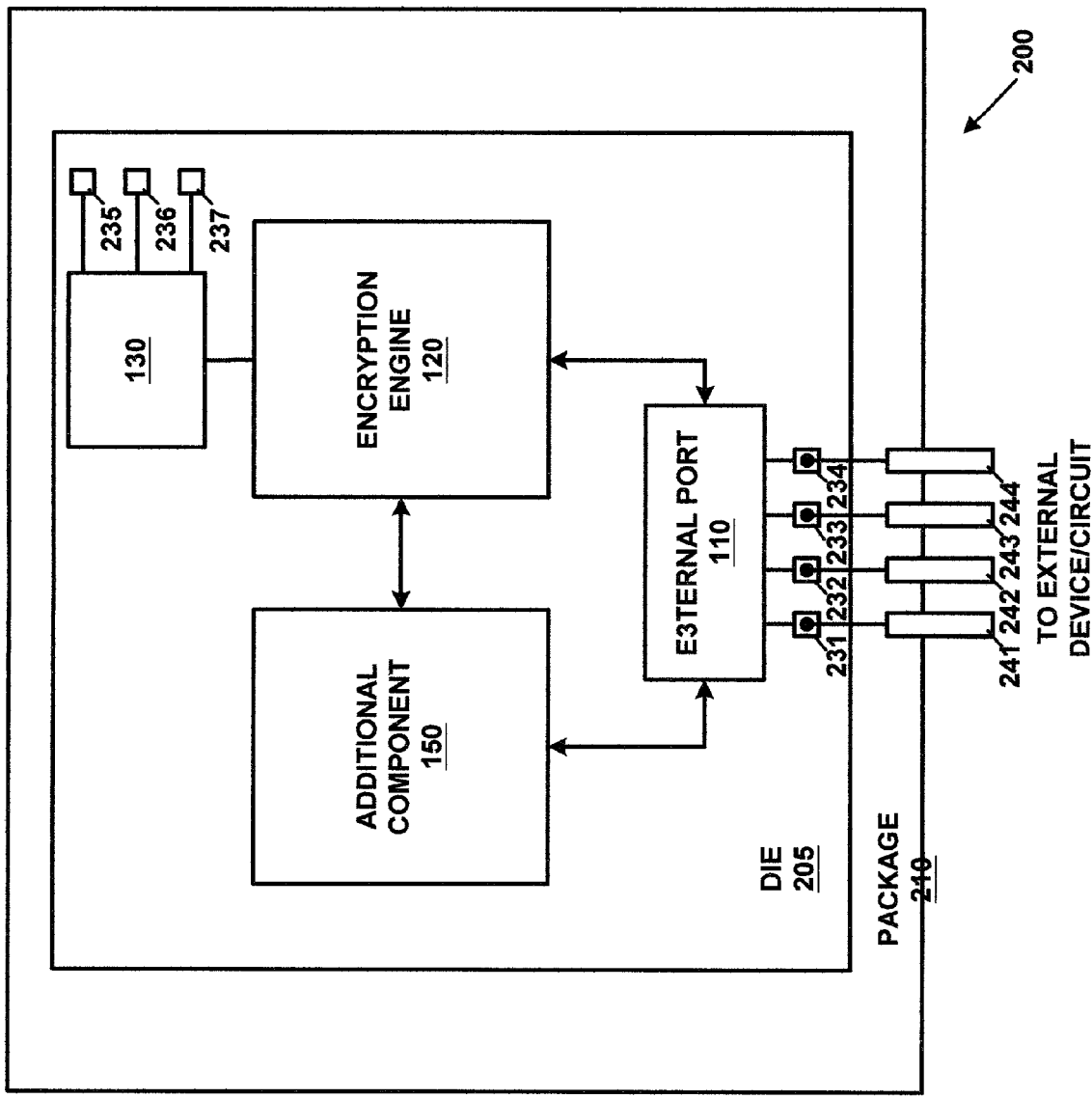
FIG. 2 is a block diagram illustrating a method of providing access to a key register of a monolithic semiconductor device during a manufacturing process in accordance with at least one embodiment of the present disclosure.

FIG. 2 illustrates a variation of the monolithic semiconductor device discussed with reference to FIG. 1. Monolithic semiconductor device 200 includes external port 110, graphics engine 120, key register 130 and additional component 150, as discussed with reference to monolithic semiconductor device 100 of FIG. 1. Monolithic semiconductor device 200 additionally includes silicon die 205, package substrate 210, input/output (I/O) die pads 231–237, and external I/O pins 241–244. As illustrated, the components of monolithic semiconductor device 200 are implemented on silicon die 205 and contained in package substrate 210. Package substrate 210 can include a plastic casing, a heat sink, various pins used to interface with and provide power to silicon die 205, and the like. Package substrate 210, among other things, is used to prevent access to traces connecting portions of monolithic semiconductor device 200.

It will be appreciated that integrated circuits and other monolithic semiconductor devices often include a silicon die bonded to package substrate pins via die pads. For example, external port 110 is connected to external I/O pins 241–244 via I/O die pads 231–234, thereby allowing external entities to interface with monolithic semiconductor device 200 via external I/O pins 241–244. Similarly, I/O die pads 235–237 connected to key register 130 can be used to interface with key register 130 during the manufacturing and/or die testing processes. However, in at least one embodiment, no connection exists between I/O die pads 235–237 and any external pins of package substrate 210, thereby preventing external access to key register 130 once packaging is complete. Accordingly, the manufacture of monolithic semiconductor device 200 can define the contents of key register 130 and/or verify the contents during the manufacturing phase while preventing access in the finished product.

Figure 3:
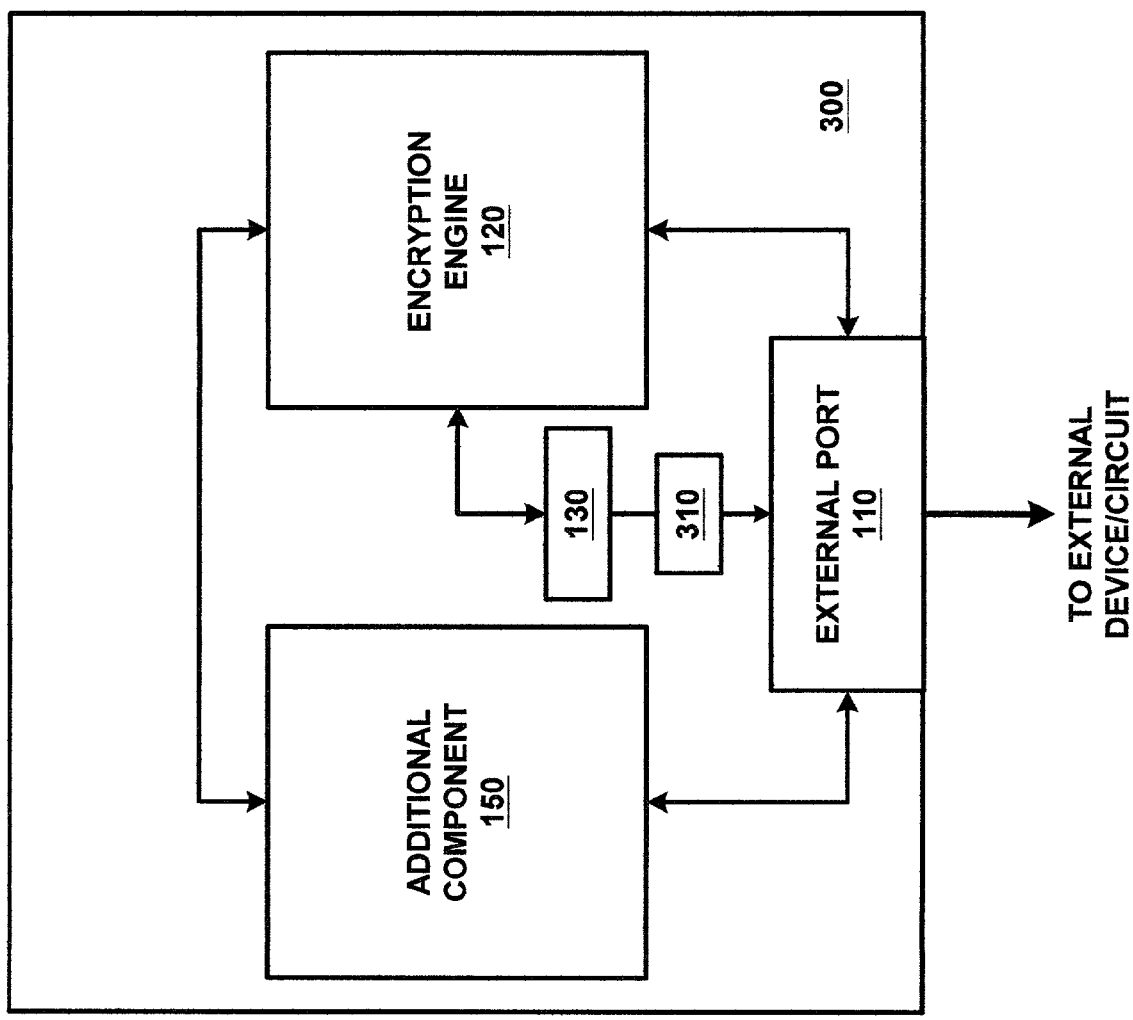
FIG. 3 is a block diagram illustrating a method for providing temporary access to a key register of a monolithic semiconductor device in accordance with at least one embodiment of the present disclosure.
Figure 4:
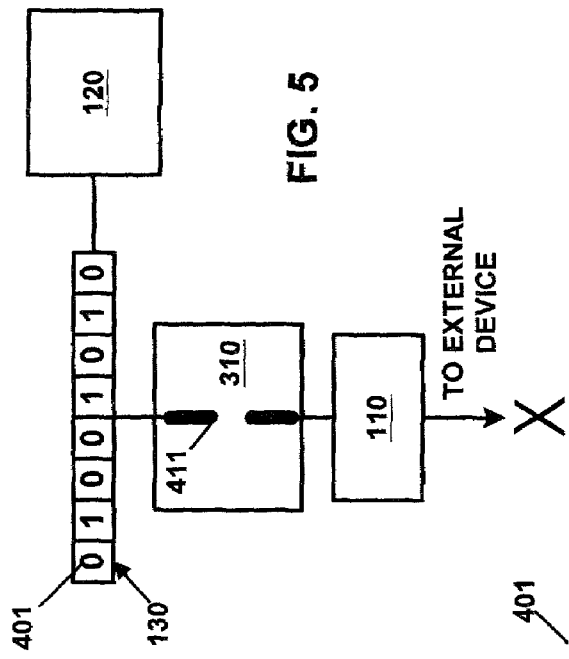
FIGS. 4–5 are block diagrams illustrating the use of an isolation portion to control the external accessibility of a key register in accordance with at least one embodiment of the present disclosure.
Figure 5:
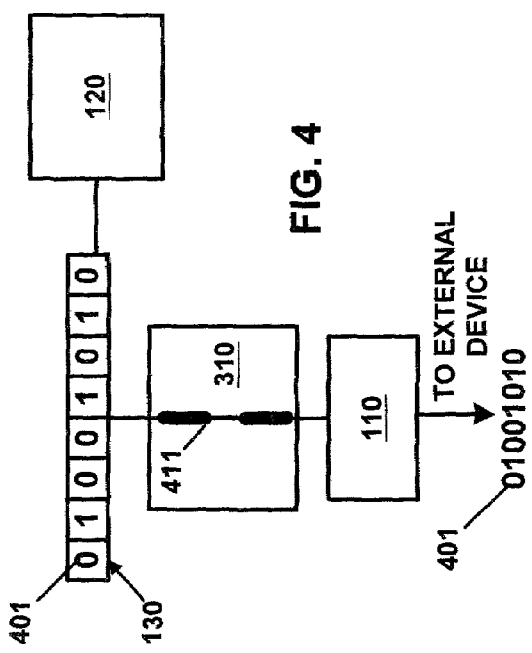

FIGS. 3–5 illustrate another variation of the monolithic semiconductor device discussed with reference to FIG. 1. In addition to the components of monolithic semiconductor device 100 (FIG. 1), monolithic semiconductor device 300 also includes isolation portion 310 used to connect key register 130 to external port 110. Isolation portion 310, in one embodiment, includes a fuse that can be blown using external or internal input. For example, as illustrated in FIG. 4, while fuse 411 is intact, encryption key 401 stored in key register 130 is observable to a circuit or device external to monolithic semiconductor device 300. Likewise, if key register 130 is programmable, then an external entity can program a desired encryption key 401 into key register 130. For example, a software application can periodically generate a new encryption key value to replace the previous stored encryption key in key register 130 as a countermeasure to any potential unauthorized attempts at access to the contents of key register 130. By periodically changing the encryption key value, if an unauthorized entity were to gain access to the encryption key via key register 130, the accessed value would only be useful until a new encryption key is generated.

However, after any necessary access to key register 130 by an external entity is performed, fuse 411 can be blown to prevent subsequent access, as illustrated in FIG. 5. Because no valid physical connection exists between key register 130 and external port 110, an external device is unable to directly access the contents of key register 130. In one embodiment, fuse 411 is blown using an externally generated current. For example, after a manufacturer has verified the correct value stored in key register 130 using a testing process or program, the manufacturer could provide a current to fuse 411 via external port 110 that exceeds the capacity of fuse 411, thereby causing the metal of fuse 411 to melt. In another embodiment, isolation portion 310 includes logic that determines when fuse 411 is to be blown and then blows the fuse at the appropriate time. For example, the logic could be programmed to blow the fuse after a certain number of accesses of the contents of key register 130. Other implementations of isolation portion 310 to prevent subsequent external access to key register 130 may be used without departing from the spirit or the scope of the present disclosure.

Figure 6:
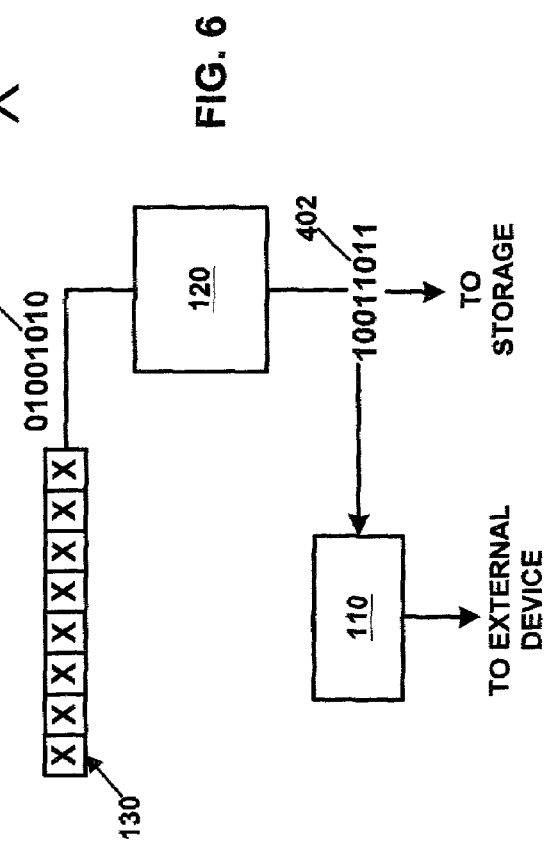
FIG. 6 is a block diagram illustrating the generation and storage of a private encryption key and a corresponding public encryption key in accordance with at least one embodiment of the present disclosure.

As discussed previously, in at least one embodiment, the key register of the monolithic semiconductor device includes volatile memory, such as RAM, registers, or cache. In this case, the contents of the key register can be reprogrammed with a new data value each time the monolithic semiconductor device is "powered up" and/or reprogrammed between sessions with a second device. FIG. 6 illustrates one method of reprogramming the contents of the key register. In at least one embodiment, the monolithic semiconductor device disclosed herein is used as part of an asymmetric encryption device and/or system. Accordingly, where key register 130 includes volatile memory and is to be reprogrammed between sessions or during power ups, encryption engine 120 can be used to generate a private key and a public key for its use. For example, encryption engine 120 can use the RSA algorithm to randomly generate private key 601 and public key 602. Private key 601 can be stored in the memory location or register represented by key register 130 for subsequent use by encryption engine 120 to decrypt data encrypted using public key 602. Public key 602 can be stored locally, such as in memory or a register internal to encryption engine 120 or in memory used by one or more elements of the monolithic semiconductor device, such as memory 140 (FIG. 1). In addition to, or instead of, storing public key 602 locally, public key 602 can be provided to an external entity via external port 110 for use in encrypting data intended for a device or system implementing the monolithic semiconductor device disclosed herein.

Whether generated and permanently programmed during manufacture, or programmed by software at a later date, in at least one embodiment, public key 602 is recorded for access in a non-secure manner. For example, public key 602 can be recorded in a public, or semi-public, database. Likewise, in one embodiment, public key 602 is represented as a bar code or label affixed to the chip package. For example, a monolithic silicon device used to encrypt/decrypt video data could be manufactured by a chip manufacturer and then provided to various vendors for use in their proprietary video systems. In this case, the bar code or label could be scanned by the vendors to determine public key 602, and public key 602 then be implemented in the video system as necessary. By affixing a label or barcode to provide a record of public key 602, a central key management system would not be needed to supply public key 602 to the clients of a chip manufacturer.

Figure 7:
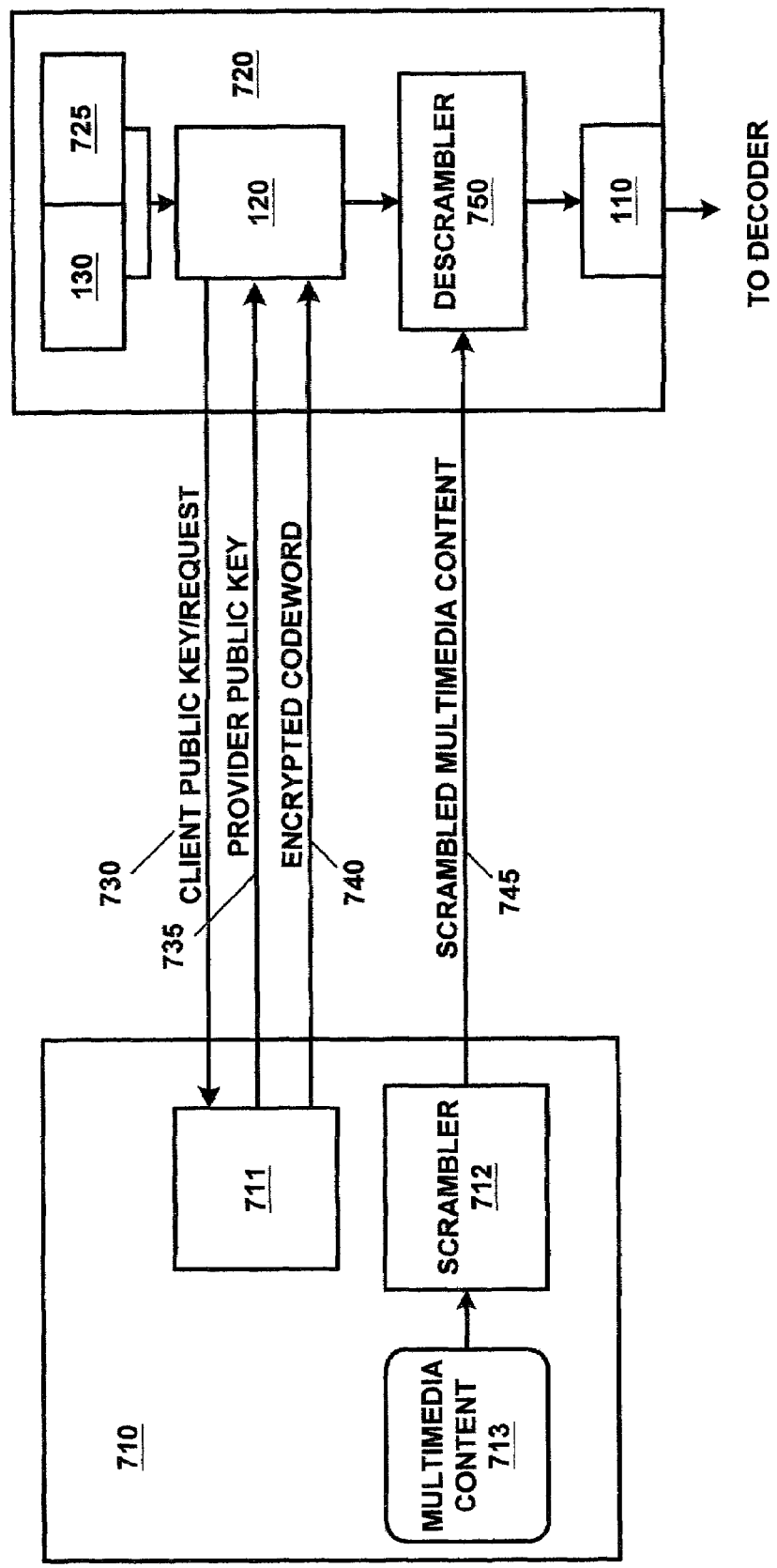
FIG. 7 is a block diagram illustrating an exemplary implementation of a monolithic semiconductor device used to decrypt encrypted MPEG content in accordance with at least one embodiment of the present disclosure.

Referring now to FIG. 7, an exemplary implementation of the monolithic semiconductor device is illustrated according the present disclosure. System 700 includes a system for encrypting and decrypting motion pictures experts group (MPEG) data transmitted between MPEG source 710 and MPEG client interface 720. MPEG source 710 includes source interface 711 and scrambler 712. MPEG client interface 720 represents an implementation of the monolithic semiconductor device disclosed herein. MPEG client interface 720 includes key register 130, unique ID register 725, encryption engine 120, descrambler 750, and output port 110.

In this exemplary implementation, MPEG source 710 provides an encrypted control word to MPEG client interface 710, where the control word is used to descramble scrambled MPEG data provided by MPEG source 710. The session is initiated with transmission 730 where encryption engine 120 of MPEG client 720 provides a session request and a representation of its (the client's) public key, such as public key 602 (FIG. 6), to source interface 711 of MPEG source 710. Transmission 730 can also include a representation of the unique ID stored in UID register 135 used to identify the MPEG client to verify the source of transmission 730. Source interface 711 can then verify the identification of MPEG client interface 720 using the unique ID and/or the client public key and respond to a positive verification by providing encryption engine 120 with the public encryption key associated with MPEG source 710, if needed. The source public encryption key can be used by MPEG client interface 720 to encrypt data transmitted from MPEG client interface 720 to MPEG source 710.

In transmission 740, MPEG source 710 provides an encrypted control word to encryption engine 120 of MPEG client interface 720, where the control word is encrypted using an asymmetrical encryption method, such as the RSA encryption method. The encrypted control word can then be decrypted by encryption engine 120 by using the client private key. The decrypted control word is then provided to descrambler 750. In this implementation, the control word includes a symmetrical key used in a symmetrical encryption/decryption scheme, such as data encryption standard (DES), triple DES (3DES), advanced encryption standard (AES), digital video broadcasting-common scrambling (DVB-CS), common scrambling system (CSS), and the like.

In transmission 745, MPEG content 712 is encrypted by scrambler 712 using the control word and a symmetrical encryption method, such as DES, and provided to descrambler 750. MPEG content 713 includes encoded video and/or audio content. For example, MPEG source 710 can include a digital versatile disc (DVD) player, and MPEG content 712 can include MPEG data from a DVD. Descrambler 750 decrypts the encrypted MPEG content 713 using its copy of the control word used by scrambler 712 to encrypt MPEG content 713. The decrypted MPEG content 713 can then be provided to a MPEG decoder (not shown) via external port 110. After the session is completed, the control word is discarded by both MPEG source 710 and MPEG client interface 720 and a different control word is used for a subsequent session.

In many instances, using symmetrical encryption methods for encryption/decryption is measurably faster and less resource-intense than using asymmetrical methods. However, when symmetrical encryption methods are somewhat less secure since more than one entity has the single key that both encrypts and decrypts data. Accordingly, by using an asymmetrical encryption/decryption method to encrypt and decrypt a second symmetrical key (i.e. the control word), the speed of symmetrical encryption/decryption can be utilized in addition to the relative security of asymmetrical encryption/decryption methods. Since the private key stored in key register 130 is practically impossible to access externally, an unauthorized entity is unlikely to obtain the private key and decrypt the encrypted control word using the private encryption key. Without the private encryption key, an unauthorized entity generally must turn to brute-force methods of decrypting the encrypted control word. If the encryption method used is secure enough, such as using a 128-bit or higher key with RSA encryption, it is highly unlikely that the brute-force method of decrypting the encrypted control word would be successful. Likewise, without the decrypted control word, an unauthorized entity would have little chance of success in decrypting the encrypted MPEG content 713 if it is encrypted with a strong symmetrical encryption method, such as 3DES.

The preceding detailed description of the figures, reference has been made to the accompanying drawings which form a part thereof, and to which show by way of illustration specific embodiments in which the invention may be practiced. It will be appreciated that many other varied embodiments that incorporate the teachings herein may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present disclosure is defined only by the appended claims.

What is claimed is:

1. A monolithic semiconductor device comprising:
a memory location having an output port, wherein a data value to be stored in said memory location is observable only internally to the monolithic semiconductor device;
an asymmetrical encryption engine having an input port coupled to the output port of the memory location and an output port to provide a symmetrical encryption key based on the data value;
a symmetrical encryption engine having an input port coupled to an output port of the asymmetrical encryption engine, wherein the symmetrical encryption engine is to perform an encryption function using the symmetrical encryption key; and
at least one silicon die pad having an input coupled to output port of said memory location to provide temporary access to said memory location.

2. A monolithic semiconductor device comprising:
an external data port having an input and an output;
a first encryption engine having an input coupled to the input of said external data port and an output;
a second encryption engine having an input coupled to the output of the first encryption engine and an output;
a memory location having an output coupled to the input of said first encryption engine;
an isolation portion coupled to the output of said memory location and to the input of said external data port, wherein said isolation portion is modifiable to permanently prevent access of said memory location by the external data port; and
wherein the first encryption engine is to provide a first encryption key based on a value stored at said memory location to said second encryption engine.

3. The monolithic semiconductor device as in claim 2, wherein said memory location includes non-volatile memory.

4. The monolithic semiconductor device as in claim 3, wherein said value stored in said memory location is defined during a manufacture of the monolithic semiconductor device.

5. The monolithic semiconductor device as in claim 4, wherein said value is defined using a lithographic technique.

6. The monolithic semiconductor device as in claim 4, wherein said value is defined using a laser etching technique.

7. The monolithic semiconductor device as in claim 2, wherein said memory location includes volatile memory.

8. The monolithic semiconductor device as in claim 2, wherein said memory location is located in a specific location of the monolithic semiconductor device.

9. The monolithic semiconductor device as in claim 2, wherein said value includes a second encryption key.

10. The monolithic semiconductor device as in claim 9, wherein said memory location is to store a plurality of encryption keys.

11. The monolithic semiconductor device as in claim 9, wherein said first encryption engine is to use a portion of the first encryption key to perform an encryption function.

12. The monolithic semiconductor device as in claim 9, wherein said first encryption engine is an asymmetrical encryption engine and said second encryption engine is a symmetrical encryption engine.

13. The monolithic semiconductor device as in claim 12, wherein the first encryption key includes a symmetrical encryption key, and wherein said second encryption engine is to perform an encryption function using the symmetrical encryption key.

14. The monolithic semiconductor device as in claim 2, wherein said isolation portion includes a fuse coupled between the input of said external port and the output of said memory location.

15. The monolithic semiconductor device as in claim 2, further including at least one silicon die pad coupled to the output of said memory location to provide temporary external access to said memory location.

16. The monolithic semiconductor device as in claim 2, further including a unique ID register having an output coupled to the input of said first encryption engine to store a unique ID.

17. A method comprising:
accessing, by a first encryption engine internal to a monolithic semiconductor device, data from a memory location internal to the monolithic semiconductor device, wherein the memory location is accessible only internal to the monolithic semiconductor device;

generating, at the first encryption engine, a first encryption key based on the data from the memory location, wherein the data represents a second encryption key;

providing the first encryption key for storage in the memory location;

providing the first encryption key to a second encryption engine internal to the monolithic semiconductor device; and performing an encryption function at the second encryption engine using the first encryption key.

* * * * *